July 23, 1968  D. GUSTAVSSON ET AL  3,393,759

VEHICLE CONSTRUCTION

Filed April 5, 1965  3 Sheets-Sheet 1

INVENTOR.
DAVID GUSTAVSSON and
SVEN-ERIK NORE ERIKSSON
BY ERIC Y. MUNSON,
Attorney July 23, 1968  D. GUSTAVSSON ET AL  3,393,759
VEHICLE CONSTRUCTION
Filed April 5, 1965  3 Sheets-Sheet 3

INVENTOR.
DAVID GUSTAVSSON and
SVEN-ERIK NORE ERIKSSON
BY
ERIC Y. MUNSON,
Attorney

United States Patent Office 3,393,759
Patented July 23, 1968

3,393,759
VEHICLE CONSTRUCTION
David Gustavsson, Orebro, and Sven-Erik Nore Eriksson, Adolfsberg, Sweden, assignors to Atlas Copco Aktiebolag, Nacka, Sweden, a corporation of Sweden
Filed Apr. 5, 1965, Ser. No. 445,417
6 Claims. (Cl. 180—6.48)

ABSTRACT OF THE DISCLOSURE

A vehicle substructure comprising two substantially identical wheel supporting side frame components which may be interchangeably connected to a central frame component and which side frame components are symmetrical about a vertical transverse plane, each of the wheels being separately driven by a motor.

---

Figure 1:
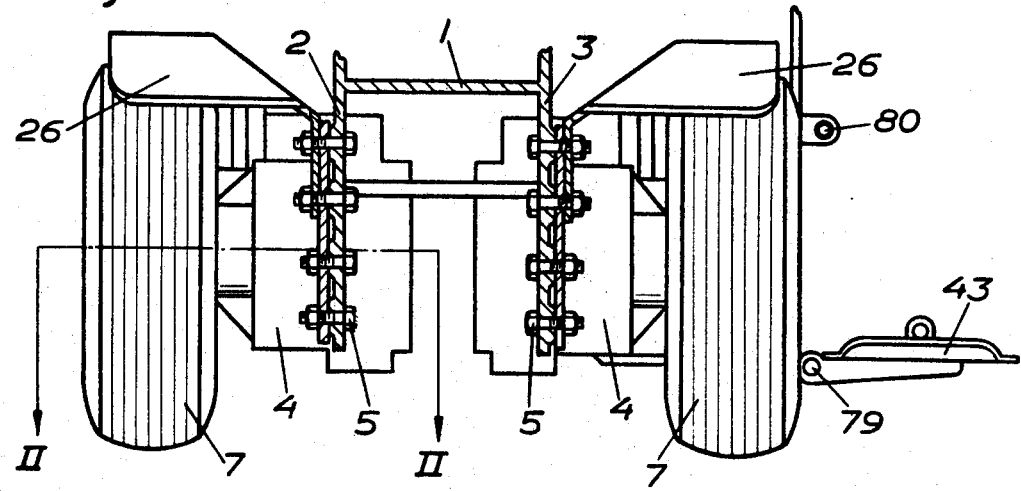

This invention relates to heavy duty vehicles particularly for use in underground mining operations, in tunneling or in other underground work where the vehicles are exposed to extremely severe operating conditions and where failure of the vehicles should be avoided as much as possible. Vehicles of this type may of course also be used in work above the ground where severe conditions or other circumstnaces justify the use of these rather expensive and robust vehicles. One object of the present invention is to reduce the price and manufacturing costs of vehicles of this type by so designing the vehicle that expensive components of the same construction are used in the left and right side of each vehicle and in a number of vehicles serving different purposes. Another object of the invention is to provide a vehicle for underground use which can easily be taken apart in a number of components which may be handled and transported in narrow passages and which may then easily be reassembled at the working place under the ground. A still further object of the invention is to so design the vehicle that vital parts are easily accessible for inspection, service and replacement of worn parts.

For the above and other purposes we provide a vehicle substructure comprising two side frame structures, which are substantially identical and interchangeable and symmetrical about a vertical transverse plane, said side frame structures being secured to each other or preferably to a central frame structure and provided each per se with ground engaging means and a motor for driving said ground engaging means. One embodiment of a vehicle substructure component according to the invention is illustrated in the accompanying drawings by way of example. The drawings also show by way of example three different types of vehicles in which the described vehicle substructure component forms parts. It should be understood, however, that the vehicle substructure component and vehicles illustrated in the drawings may be modified in several different ways within the scope of the appending claims and furthermore vehicle substructure components according to the invention may be used for other vehicles than those illustrated in the drawings.

Figure 2:
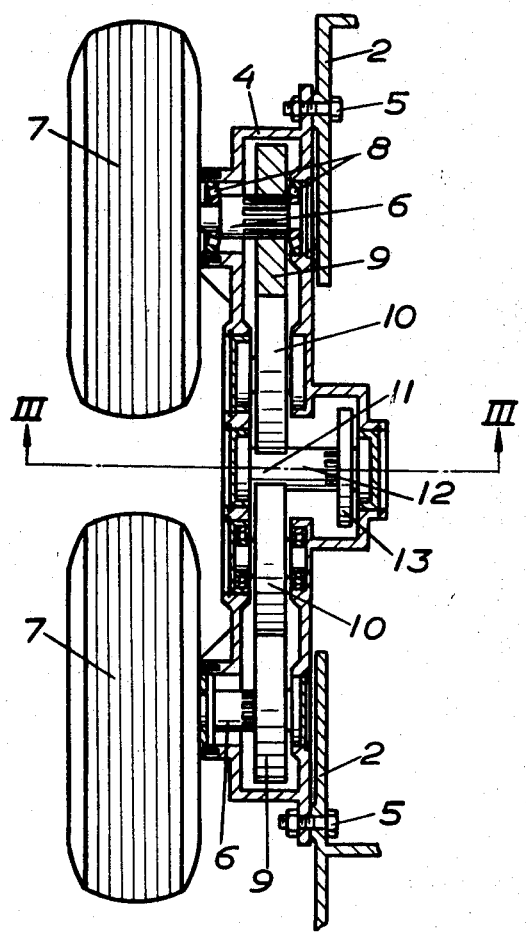
Figure 3:
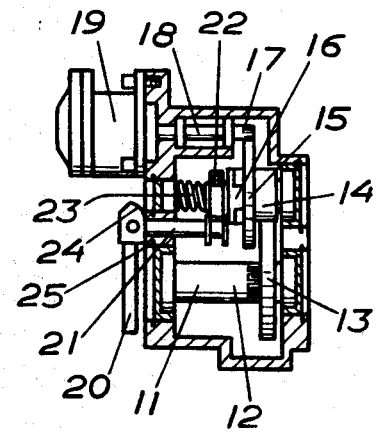
Figure 4:
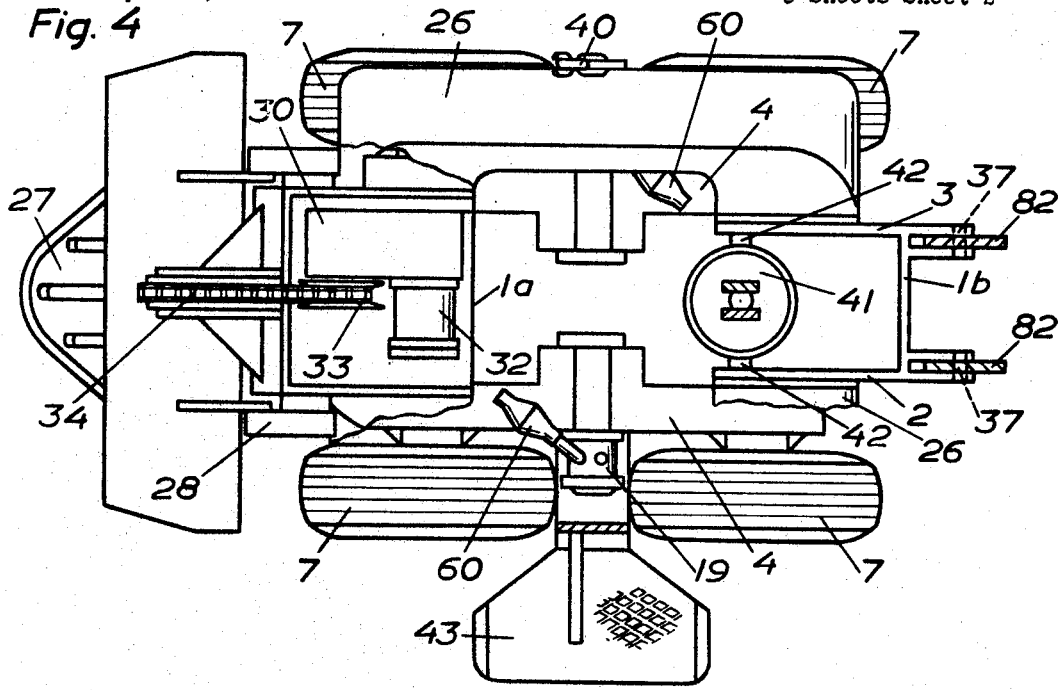
Figure 5:
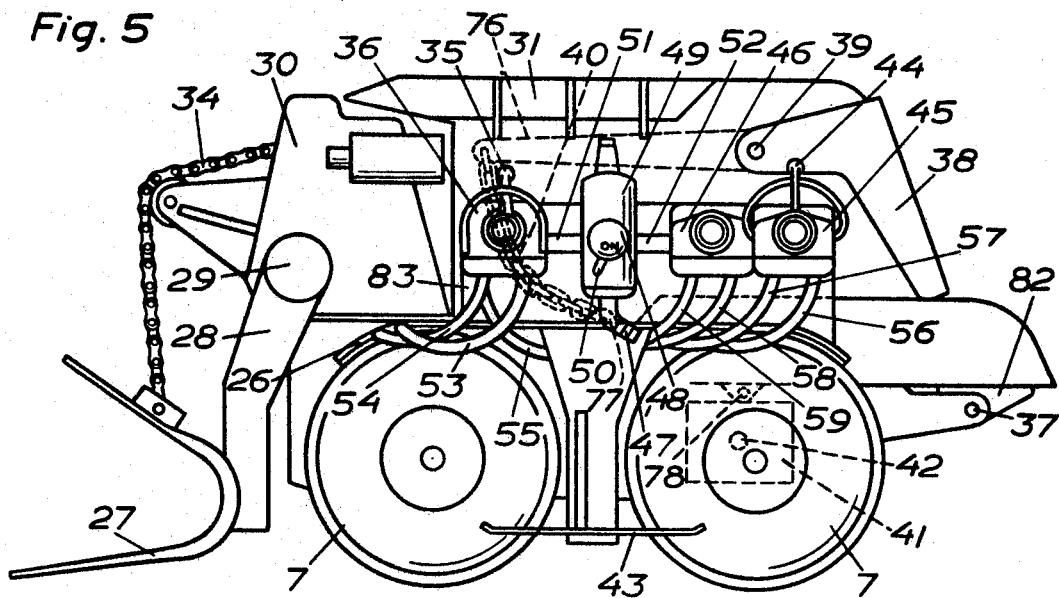
Figure 6:
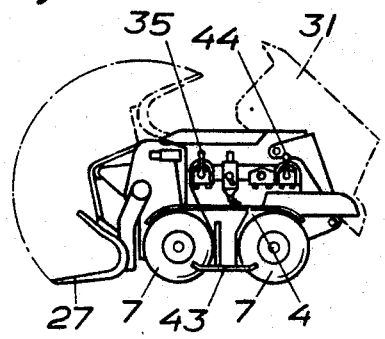
Figure 7:
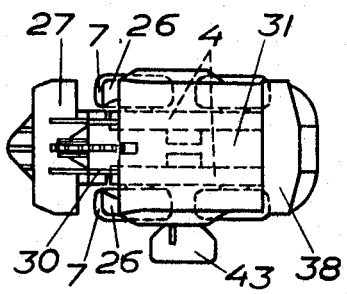
Figure 8:
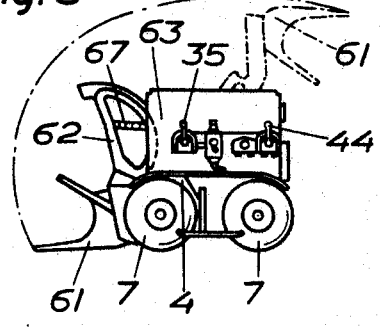
Figure 9:
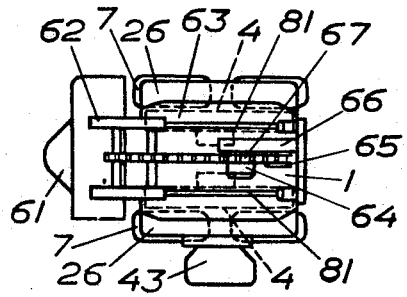
Figure 10:
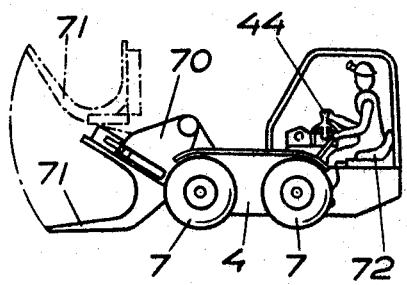
Figure 11:
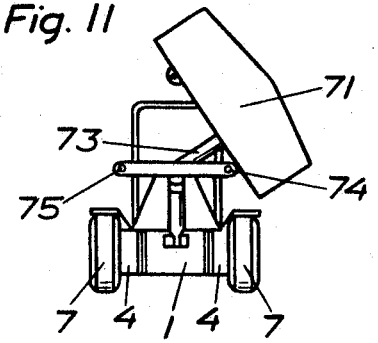
Figure 12:
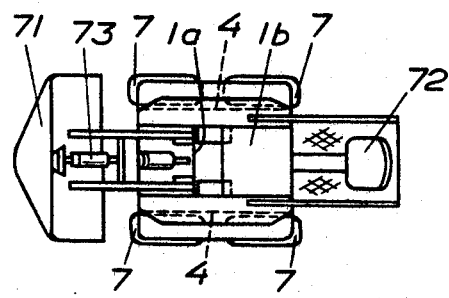

FIG. 1 is a transverse cross section and partial end view of a vehicle substructure according to the invention. FIG. 2 is a horizontal section of one side frame structure forming a vehicle substructure component of the substructure in FIG. 1, the section being taken through the two wheel axes on lines II—II in FIG. 1. FIG. 3 is a vertical section on line III—III in FIG. 2. FIG. 4 is a plan view of the substructure of an autoloader according to the invention with the receptacle taken away, and FIG. 5 is a side view of the autoloader according to FIG. 4 looking towards the operator's side. FIGS. 6, 8 and 10 are side views on a reduced scale of different mine loaders according to the invention. FIG. 7 is a plan view of the loader in FIG. 6. FIG. 9 is a plan view of the loader in FIG. 8. FIG. 11 is a front end view of the loader in FIG. 10 and FIG. 12 is a plan view of the loader in FIG. 10.

The vehicle substructure illustrated in FIGS. 1–5 consists of a central frame structure 1 formed substantially by two hollow casings 1a and 1b, FIG. 4, having side walls 2, 3 and two side frame structure components 4 secured to the central frame structure 1a, b by bolts 5. The side frame structure components 4 at each side of the central frame structure 1 are identical and symmetrical relative to a transverse vertical plane through the section line III—III. Each side frame structure component 4 comprises an elongated casing in which shafts 6 for identical wheels 7, 7 are mounted in large taper roller bearings 8. Splined on each shaft 6 is a cylindrical toothed gear 9 which mesh with idle cylindrical gears 10 driven from a cylindrical pinion 11 carried by a shaft 12 provided with a drive gear 13 which is driven over gears 14, 15 coupled together by means of a claw coupling 16. The gear 15 is driven by a pinion 17 provided on a shaft 18 of a pressure fluid operated variable speed reversible motor 19, such as a reversible sliding vane compressed air motor. The claw coupling 16, FIG. 3, may be moved out of engagement by means of a lever 20 and a rod 21 which engages a ball bearing 22 for moving the coupling member 16 axially against the action of a spring 23. The lever 20 is for this purpose swingable on the rod 21 so that a cam surface 24 on the lever 20 engages an abutment 25 and moves the claw coupling out of engagement.

In the plan view of FIG. 4 and the side view of FIG. 5 the vehicle substructure according to FIGS. 1–3 is illustrated together with a loading shovel and a shovel operating mechanism in FIG. 4 and together with the shovel and a receptacle to be loaded by said shovel as well as the various operating handles needed for the operator in FIG. 5. In FIGS. 4 and 5 the reference 26 indicates splash guard plates and 27 a shovel which is carried by an arm structure 28 pivotally mounted at 29 on a casing 30 carried by the casing 1a and containing the shovel operating gear and provided with an air motor 32 for driving a chain reel 33. The air motor 32 drives the chain reel 33 over a not illustrated transmission provided in the casing 30 and the chain reel 33 is connected to the shovel by means of a chain 34. The shovel operating motor is controlled by a handle 35 and valve means 36 which controls the supply of compressed air to the shovel operating motor 32 and the exhaust from said motor so that the shovel may be moved from digging position as illustrated in FIG. 5 to raised or discharge position in which the shovel discharges its contents into a receptacle 31. This receptacle 31 is illustrated in FIG. 5 but is substantially left out in FIG. 4 in order to show the substructure, the mounting lugs 82 of the receptacle 31 which are swingable on pivots 37 being the only parts shown in FIG. 4. The receptacle is swingable from the position illustrated in FIG. 5 to a raised discharge position in which the rear wall 38 of the receptacle is tilted on a pivot 39 by the action of a chain 40 which is secured to the arm 76 of the wall 38 illustrated in dotted lines in FIG. 5 and to the substructure at 77 and which is stretched when the receptacle 31 is tilted so that the rear wall 38 opens. The receptacle 31 is tilted rearwards by an air cylinder and piston 41 which is swingably mounted on pivots 42 in the rear central frame structure casing 1b and pivotally connected to the bottom of the receptacle 31 at 78.

For the convenience of the operator a platform 43 is provided at the left side of the loader, said platform being tiltable upwards towards the side of the loader during transportation on a hinge 79 upon removal of a pin 80, FIG. 1. Within reach of an operator standing on the platform 43 a handle 44 is provided which controls the traction motors 19 of the left and right hand side frame structures 4. The handle 44 controls two valve means 45 and 46, one for the left and the other for the right side motor 19 of the vehicle, said valve means being disposed on a side panel 83 and described in detail in a copending application by Sven-Erik Nore Eriksson for "Improvements in Control Valve Devices," filed concurrently herewith.

Compressed air is supplied to the loader through a hose connection 47, a main valve 48 and an oiler 49, said main valve being controlled by a lever 50 which in closed position shuts off all air supply to the loader. From the oiler 49 compressed air is distributed to the valve means 36 through a pipe 51 and to the valve means 45, 46 through a pipe 52. From the valve means 36 a hose 53 leads to the motor 32 for raising the shovel and a hose 54 for reversing said motor when it is desired to lower the shovel. A third hose 55 leads from the valve means 36 to the pneumatic cylinder 41 for tilting the receptacle 31. The shovel 27 may be raised or lowered by moving the handle 35 longitudinally of the loader towards the right or the left in the drawing. The pneumatic cylinder 41 may be supplied with compressed air and operated by swinging the handle 35 transversely to the loader towards the operator causing the receptacle 31 to be tilted. The illustrated receptacle 31 may be tilted towards the end of the loader but it is obvious that a receptacle 31 may easily be arranged for side tipping if desired, and the modification of the receptacle including a movable sidewall and hinges for side tipping as well as 90° re-arrangement of the swing mounting of the cylinder 41 would be obvious to anybody skilled in the art. The handle 44 controls valve members in the valve means 45 and 46 which control the left and right hand motors 19 for the traction wheel pairs of the loader. The valve means 45 is connected to the left side motor 19 for forward and reverse operation by means of hoses 56 and 57 and the valve means 46 is similarly connected to the right side motor 19 through hoses 58, 59, 60 indicates the exhaust dampening mufflers of the motors 19, 19. When the handle 44 is moved towards the shovel end in longitudinal direction of the loader both traction motors 19 drive the loader forwards and when the handle 44 is moved in the opposite direction said motors are reversed. If the handle 44 is moved towards the operator the wheels on the operator side are reversed and the loader makes a left hand turn and if the handle is pressed against the loader from the operator the wheels on the other side are reversed and the loader turns to the right when driven in digging direction. If the handle is moved only slightly to the left or to the right the loader can be made to make a turn with great turning radius. The operating mechanism for steering the loader is described in detail in the assignees copending application "Improvements in Control Valve Devices" filed simultaneously herewith and it is therefore deemed unnecessary to show and describe it in detail here. Due to the wide tread and short wheel base steering of the loader according to the invention is rather easy, and it has been found that the rubber tires are not unduly worn by this way of steering. This among others appears to be due to the fact that the traction wheel tread is as large or larger than the wheel base, and also preferably larger than the traction wheel diameter.

FIGS. 6–12 show various vehicles used for loading and transportation in mines and similar working places in which vehicle substructure components according to the invention form parts. FIG. 6 is a side view and FIG. 7 a plan view on a reduced scale somewhat diagrammatical of a shovel loader provided with a transportation receptacle which may be loaded by the shovel. The shovel is shown in dotted lines in raised discharge position and the receptacle is shown in dotted lines in tilted position. This loader is the same as illustrated on a greater scale in FIGS. 4 and 5. It is obviously therefore not necessary to describe it again. The same reference numerals as in FIGS. 4 and 5 have been used in FIGS. 6 and 7, which show the shovel and receptacle in lowered and raised positions.

FIG. 8 is a side view and FIG. 9 a plan view of an overhead shovel loader which has a shovel 61 carried by an arm structure 62 and movable from a low digging and loading position in front of the loader to a raised discharge position at the rear end of the loader as illustrated in dotted lines in FIG. 8. This type of machine is well-known in the art and the only novelty in the machine in FIGS. 8 and 9 is that the shovel structure and the shovel operating gear and rails are provided on a central frame section 1 similar to the central frame section 1 in FIG. 1 but comprising a one piece casing. Furthermore, the traction wheels are of the same type as above described in connection with FIGS. 1–5 and the controls have been provided on the side plate 63, and the central frame section 1 is carried by side frame structures 4, 4. The shovel operating motor is indicated at 64 and drives a chain reel 65 over a gear transmission 66. 67 indicates the chain which connects the chain reel 65 with the arm structures 62 of the shovel for operating the shovel in conventional manner. The rocker arm structure rolls on rails 81 carried by the central frame structure 1.

FIGS. 10–12 are a side view, a front end view, and a horizontal view of a shovel loader with side tipping shovel. The shovel operating gear 70 is provided at the front end casing 1a of the central frame structure 1, which in the manner described above is secured between side frame structure components 4, 4 with wheels 7. The mechanism for operating the shovel does not form a part of this application and is therefore not described in detail. Front loaders with a shovel that can be tipped to one or any side after having been raised are well known in various designs. One embodiment is described in assignee's copending application "Improvements in Labor Shovels and Shovel Tilting Means," filed by Sven-Erik Nore Eriksson concurrently herewith. It should only be noted that the shovel 71 in this loader may be raised from the digging position illustrated in full lines in FIG. 10 to tilting position illustrated in dotted lines in FIG. 10 and may then be tilted to the left or to the right as illustrated in FIG. 11 by means of a power cylinder 73. In this case the operator is seated on an operator's seat 72 provided at the rear end casing 1b of the central frame structure 1. 74 and 75 are tilting pivots for the shovel 71.

It should be observed that the central frame structure 1 of the various embodiments illustrated in FIGS. 6–12 are not alike but differ with regard to the superstructure for which the substructure is intended and in some cases the central frame structure is a single rigid casing and in other cases it consists of two separate casings. The side frame structures 4, 4, however, are the same in all the various embodiments and in the left and right side of each embodiment. The operating valves and operating levers for the shovel operation are the same in FIGS. 6–9 and the operating valves for the traction motors are the same in FIGS. 6–12. The left hand side frame substructure component is always exactly the same as the right hand side frame substructure component. Since the side frame substructure components include the traction wheels, the traction motor and gearing between the motor and the wheels a very great saving and rationalisation of the manufacture of these loading machines is hereby achieved.

The vehicle substructures and components and vehicles above described and illustrated in the drawings should only be considered as examples and may be modified in different ways within the scope of the claims. For instance, it is possible to provide the side frame structures with track laying bands carried over the wheels in which case the wheels may be replaced by suitable track moving sprocket wheels. The invention has been described in connection with rigid side frame substructure components in which the ground engaging wheels are not steerable and vehicle steering is obtained by running one side wheels with a speed which differs from the speed of the other side wheels. Substructure components according to the invention may, however, be carried out with the front and rear wheels steerable which, however, is much more expensive and can be avoided with little disadvantage when the substructures are built according to the invention. Other modifications are also obvious to those skilled in the art within the scope of the following claims.

What we claim is:

1. A vehicle comprising a central substructure and at least two substantially identical side substructure components which are interchangeable one to the other and provided with vehicle supporting wheels disposed symmetrically with respect to a transverse vertical plane and mounted for rotation and forward and backward movement of the vehicle, each said side substructure component having a frame structure containing a series of toothed transmission gears mounted in the said frame structure and forming a power transmission between a reversible variable speed motor fitted at the said frame structure and the vehicle supporting wheels, means for removably connecting each said frame structure to a side of said central substructure component, and means for mounting a material handling structure on said central substructure component.

2. A vehicle substructure according to claim 1, in which the toothed transmission gears in the frame structure form a continuous gear train from the motor to the supporting wheel shafts.

3. A vehicle substructure according to claim 1, in which the toothed transmission gears comprises toothed gears on the shafts of the supporting wheels which through two first intermediate toothed gears in the side frame structure and one second intermediate toothed gear in the side frame structure are driven simultaneously by the reversible variable speed motor.

4. A vehicle substructure according to claim 1, in which the power transmission includes means for driving and reversing the driving power of the two supporting wheels in one frame structure separately and independently from driving and reversing the two supporting wheels in the second frame structure, and in which the distance between said pairs of supporting wheels, i.e., the tread, is at least as large or larger than the wheel base.

5. A vehicle substructure according to claim 1, in which the motor is a sliding vane compressed air driven motor having a rotor and an end cover and mounted in such a position at said frame structure as to permit axial removal of the motor rotor upon removal of said end cover.

6. A vehicle substructure according to claim 4, in which the vehicle supporting wheels are of equal diameter and the tread is larger than the wheel diameter.

References Cited

UNITED STATES PATENTS

| | | | |
|---|---|---|---|
| 2,634,008 | 4/1953 | Osgood | 180—6.48 |
| 2,671,519 | 3/1954 | Cheramie | 180—6.48 |
| 2,764,897 | 10/1956 | McCallum | 180—6.48 |
| 2,846,984 | 8/1958 | Zwayer | 91—121 |
| 2,940,532 | 6/1960 | Lear et al. | 180—6.48 |

BENJAMIN HERSH, *Primary Examiner.*

J. A. PEKAR, *Assistant Examiner.*